United States Patent [19]

Mackey

[11] 4,385,772
[45] May 31, 1983

[54] METHOD OF RELEASABLY COUPLING ARTICULATED VEHICLES AND PREVENTING JACK-KNIFING

[76] Inventor: Patrick J. Mackey, 91-3 Woodridge Cir., Ottawa, Ontario, Canada, K2B 7T2

[21] Appl. No.: 194,953

[22] Filed: Oct. 8, 1980

[30] Foreign Application Priority Data

Oct. 11, 1979 [CA] Canada ................... 337369

[51] Int. Cl.³ .............................................. B62D 53/08
[52] U.S. Cl. .................................................. 280/432
[58] Field of Search ................... 280/432, 433, 438 A, 280/474; 180/12

[56] References Cited

U.S. PATENT DOCUMENTS

| | | | |
|---|---|---|---|
| 3,411,600 | 11/1968 | Loving et al. | 180/12 X |
| 3,580,610 | 5/1971 | Warren | 280/432 |
| 4,065,149 | 12/1977 | Roth | 280/432 |
| 4,161,329 | 7/1979 | Pilz et al. | 280/432 X |

FOREIGN PATENT DOCUMENTS 904373 7/1972 Canada ...................... 280/432

Primary Examiner—John A. Pekar
Attorney, Agent, or Firm—Cushman, Darby & Cushman

[57] ABSTRACT

A releasable coupling for an articulated vehicle of the type having a tractor and a trailer comprises a brake system and locating members for preventing or inhibiting jack-knifing of the articulated vehicle, the locating members comprising two or more pairs of members one of each pair adapted to being mounted on the tractor and the other of each pair adapted to being mounted on the trailer and arranged so that they mate when the tractor is connected to the trailer, each pair being arranged a sufficient distance on each side of the longitudinal center line of the articulated vehicle so as to result in reactive moments of force about the direction of travel that will resist any tendency of the trailer to overturn when cornering or traveling on uneven roads at operating speeds.

12 Claims, 2 Drawing Figures

METHOD OF RELEASABLY COUPLING ARTICULATED VEHICLES AND PREVENTING JACK-KNIFING

BACKGROUND AND SUMMARY OF THE INVENTION

This invention relates to an improved coupling for articulated vehicles that reduces or prevents jack-knifing of such vehicles when braking hard or on slippery surfaces. The articulated vehicles to which this invention relates and the words "articulated vehicle" will henceforth be used to mean any combination of a tractor vehicle connected, by means of a coupling device that is commonly referred to as a fifth wheel, to a load carrying trailer. The tractor conventionally comprises a chassis supported by at least two pairs of coaxially mounted wheels of which at least one pair are driven by a prime mover by means of conventional automotive transmissions and the other coaxial pair are steerable by a driver from the cab area located on the chassis. The trailer conventionally comprises a load carrying enclosure supported by at least one pair of coaxially mounted wheels that is connected to and partly supported upon the tractor by means of the fifth wheel coupling which is attached to the tractor and releasably secures the load carrying trailer to the tractor vehicle by engaging a vertical king pin attached to the trailer about which the load carrying trailer may turn relative to the tractor.

Articulated vehicles are particularly useful because a single tractor may be used to transport a number of different trailers thereby saving turnaround time when the tractor vehicle would otherwise be unuseable during loading and unloading of the trailer. While articulated vehicles have well recognized merits, they have a common drawback in that the trailer is inclined to "jack-knife" where the wheels of the articulated vehicle lose traction during hard braking or on slippery surfaces or both. By "jack-knife" is meant the uncontrolled rotation of either the tractor or the trailer about the king pin of the fifth wheel coupling unit. As a result of jack-knifing, the articulated vehicle continues to move in the direction of travel with either the tractor or trailer unit swung about the king pin of the fifth wheel coupling so as to be located at an angle to the direction of travel or, alternatively, the trailer unit of the articulated vehicle swings slowly about the king pin.

Jack-knifing usually occurs where all four wheels of the tractor portion of the articulated vehicle lose traction and the tractor skids in a straight line until any slight imbalance in the rolling resistance of the wheels imparts a force to the tractor or trailer having the component normal to the direction of travel causing the tractor portion of the vehicle to swing slowly but uncontrollably about the king pin of the fifth wheel coupling between the two units into the fully jack-knifed position. Jack-knifing may also occur where the rear wheels only of the tractor portion of the vehicle lose traction. In this condition, any force normal to the direction of travel will cause sudden and serious jack-knifing of the articulated vehicle that is very difficult if not impossible to correct. This type of instability is the cause of many fatal accidents due to the abrupt manner in which the articulated vehicle can sweep across the path of oncoming traffic while moving at operating speeds. Another extremely dangerous jack-knifing condition occurs where the trailer wheels lose traction and the trailer swings from side to side about the fifth wheel coupling thereby obstructing other lanes of traffic. In either of the latter types of instability, operation of the vehicle brakes tends to aggravate rather than alleviate the tendency to jack-knife.

Various proposals have been made for inhibiting or controlling the jack-knifing action of articulated vehicles and some of these systems have proved acceptable in use, however, most of the proposals are complex, expensive and have other shortcomings. Some of the proposals take up space inside the trailer, others require very high hydraulic pressures to operate the brake means with attendant problems of high pressure hosing, seals, maintenance and adjustment. Still others fail to operate well during foul weather. An object of the present invention is to provide an anti jack-knifing device that is simple in concept, easy and inexpensive to fabricate, adaptable to any tractor-trailer configuration, efficient in use and operable under all weather conditions.

According to the invention an anti jack-knifing device for coupling a powered tractor vehicle to a load carrying trailer includes a turntable supported for rotation about a substantially vertical spindle located and adapted to be fixed to the rear of the said tractor vehicle so that the vertical axis lies on the longitudinal center line of the tractor vehicle, a releasable coupling means that releasably connects and locates the load carrying trailer with respect to the turntable whereby rotation of the trailer with respect to the tractor will cause corresponding rotation of the turntable and annular brake surface as a unit about said vertical spindle. The annular brake surface is braked by a brake means that may be connected by valve means to the braking system of the articulated vehicle so as to prevent or inhibit rotation of the turntable and trailer during deceleration of the articulated vehicle. The said brake means is secured to a base adapted to be attached to the rear frame of the tractor vehicle. The turntable is secured to the said annular braking surface for rotation about said vertical spindle and supported by strips of any suitable bearing material attached to the upper surfaces of the rear frame of the tractor vehicle. The annular brake surface and brake means may be provided by using a standard automotive wheel hub and automotive drum or disc brake assembly. The trailer is connected to the tractor by means of a standard fifth wheel coupling, the horizontal pivot of which is arranged upon the turntable so as to be normal to the direction of travel. Any suitable locating devices keep the turntable aligned with respect to the trailer so that any rotation of the trailer with respect to the tractor will cause a corresponding rotation of the turntable. In the preferred embodiment, two side rails are attached on either side of the fifth wheel coupling unit so as to lie parallel to the longitudinal center line of the wheel tractor vehicle. Complimentary channel shaped locating members are adapted to be attached to the underside of the front of the trailer and arranged so as to engage and mate with the two side rails connected to the turntable when the tractor is coupled to the trailer. Operation of the braking system of the articulated vehicle would normally engage the braking means to prevent articulation of the tractor and trailer units but, at slow speeds where articulation is essential to manoeuverability or in the event of serious skidding or jack-knifing prior to application of the coupling brake means, the coupling breaking means can be disengaged by operating the valve means.

BRIEF DESCRIPTION OF THE DRAWINGS

The invention may further comprise those features of construction hereinafter described, by way of example only, with reference to the accompanying drawings in which.

DETAILED DESCRIPTION OF THE PREFERRED EXEMPLARY EMBODIMENT

Figure 1:
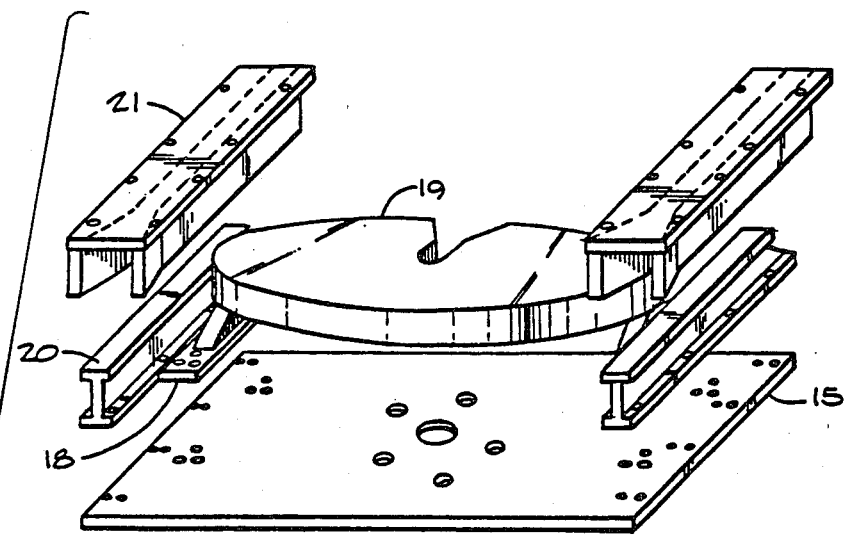
FIG. 1 is an exploded view of the tractor frame and coupling unit.
Figure 1:
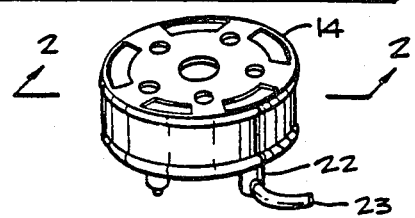
Figure 1:
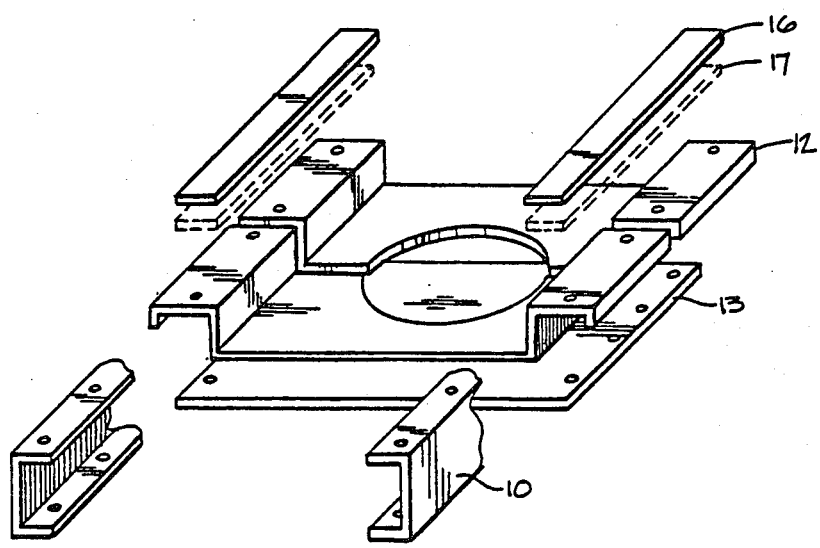

With reference to FIG. 1, an anti-jack-knife device is mounted on the tractor trailer chassis frame 10 and comprises two support plates 12 and base plate 13 that are secured by a number of bolts to the top and bottom webs of the tractor chassis frame 10. The base plate 13 and the support plates 12 locate and support the brake means 14 in the center of the tractor chassis 10. The top of the brake means 14 is secured to a flat rectangular turntable 15 and the bottom of the brake means is secured to the base plate 13, in each case by a number of bolts. The turntable 15 rotates about and is supported by the brake means 14 and by two bearing surfaces 16 made of any suitable bearing material. The bearing surfaces 15 are located on spacers 17 on the top of the upper web of the tractor chassis frame 10 and are secured using bolts or other suitable means. The upper surface of the turntable 15 supports and is provided with any suitable securing means for the attachment of supports 18 for any type of fifth wheel coupling 19 for the trailer unit of an articulated vehicle. A suitable fifth wheel coupling 19 is shown in FIG. 1. The turntable 15 also supports two side rails 20 that are secured by a number of bolts. The rear ends of these side rails are cut away from the vertical toward the front of the tractor unit to assist the fifth wheel coupling 19 in raising the trailer unit vertically when the tractor unit is being coupled to the trailer. On the underside of the front end of the trailer unit (not shown) two locating channels 21 are secured by a number of bolts. The front ends of these locating channels 21 are flared outward so as to guide the trailer unit and side rails 20 horizontally into mating contact when the tractor is being coupled to the trailer. The side rails 20 attached to the turntable 15 and the locating channels 21 attached to the trailer unit couple the trailer unit to the turntable so that when the articulated vehicle is driven, the trailer and turntable rotate as a unit about a vertical axis with respect to the tractor and the locating channels 21 are designed to accommodate a sufficient degree of articulation between the tractor and the trailer about the transverse horizontal axis of the supports 18 for the fifth wheel coupling unit 19 so as to accommodate changes in gradient found on the highways. The brake means 14 in turn controls the horizontal rotation of the turntable 15 about a vertical axis through its center relative to the base plate 13, and consequently the horizontal rotation of the trailer with respect to the tractor. The brake means 14 is operated by any suitable hydraulic or pneumatic actuator 22 that is connected by suitable piping 23 and may also be connected by valve means (not shown) to the braking system of the tractor-trailer unit.

Figure 2:
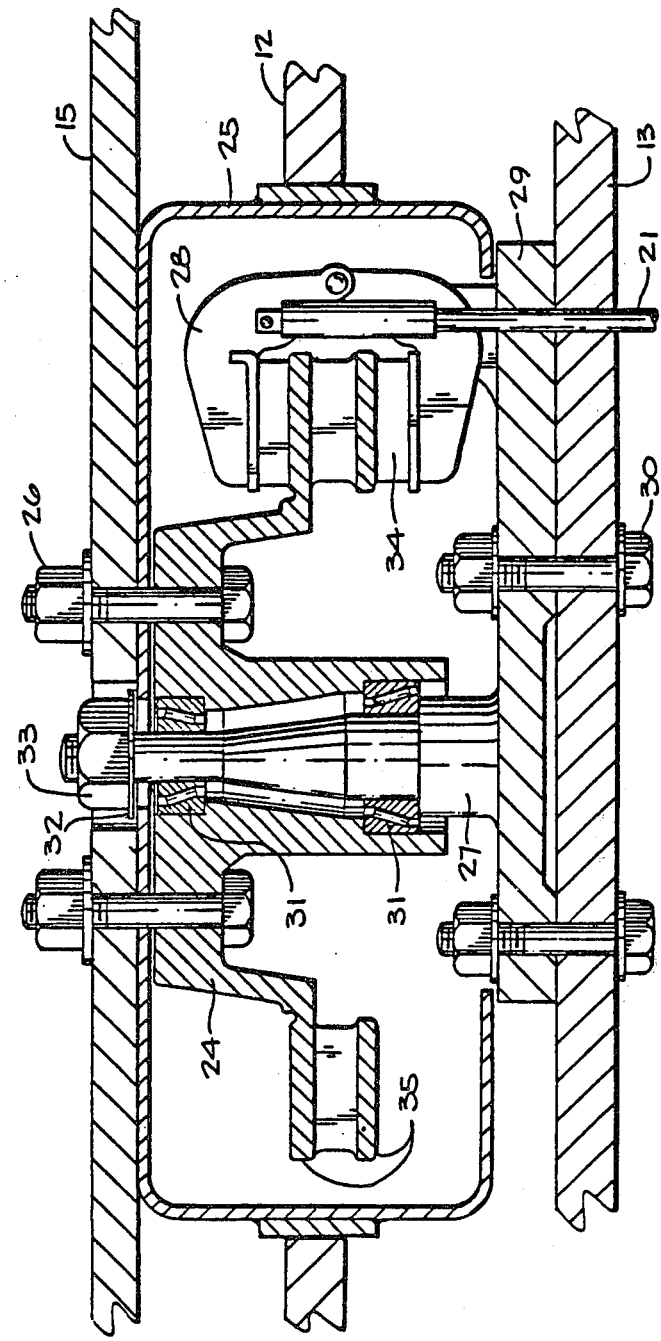
FIG. 2 is a section view of the braking means taken in the direction of arrow 2.

With reference to FIG. 2, the brake means is mounted between the turntable 15 and the base plate 13, the annular brake surface 24 and annular housing 25 being secured to the turntable 15 by a number of bolts 26, and the vertical spindle 27 and brake caliper 28 being fixed by a spider 29 secured to the base plate 13 by a number of bolts 30. The turntable 15 and annular brake surface 24 are rotatably mounted about the vertical spindle 27 by two sets of single row tapered bearing rings 31 that permit the annular brake surface 24 and turntable 15 to rotate freely about the vertical axis of the non-rotatable vertical spindle 27 that is made integral with the spider 29. The upper bearing ring and annular brake surface 24 are retained vertically on the spindle 27 by a washer 31 and nut 32. Friction elements 33 are disposed adjacent to the friction faces 34 of the annular brake surface 24 by the caliper arms 28, one or more pairs of which may be arranged about the annular brake surface 24 on the spider 29. The caliper arms 28 and friction elements 33 straddle the periphery of the annular brake surface 24. The actuator 21, when actuated, closes the caliper arms 28 and the frictional elements 33 are brought into frictional or braking engagement with the friction faces 34 of the annular brake surface 24 whereby rotation of the turntable 15 and trailer about the spindle relative to the base plate 13 and tractor is prevented or inhibited. By connecting the actuator 21 to the braking system of the articulated vehicle said braking engagement will occur automatically each time the braking system of the articulated vehicle is operated. A valve means (not shown) may be provided to permit the operator of the articulated vehicle to control the coupling by selecting vehicle braking with free articulation when desired.

The embodiments of the invention in which an exclusive property or privelege is claimed are defined as follows:

1. A releasable coupling for articulated vehicles comprising:
    (a) a base means adapted for attachment to the rear frame of the tractor;
    (b) a supporting means adapted for attachment to the rear frame of the tractor in an opposing relationship to said base means;
    (c) a brake means having one part thereof attached to the said base means;
    (d) a turntable attached to a second part of said brake means for rotation therewith, the turntable being adapted to be supported for rotation by bearing surfaces adapted to be attached to the rear frame of the tractor unit;
    (e) a fifth wheel coupling and locating means attached to the said turntable;
    (f) a king pin and locating means adapted to be attached to the underside of the front end of the trailer unit and arranged to mate with the fifth wheel, the locating means being attached to the turntable so that the trailer, the turntable and the second part of the brake means to which the turntable is attached rotate as a unit about a vertical axis when the tractor and trailer are coupled; and
    (g) a brake means adapted to be connected to the braking system of the articulated vehicle so that when the braking system of the articulated vehicle is operated, rotation of the turntable and trailer with respect to the base means and tractor is prevented or inhibited.

2. A releasable coupling according to claim 1 wherein said locating means comprise mating pairs of members being arranged on the turntable and on the trailer a sufficient distance from the longitudinal centre line of the articulated vehicle so as to provide for reactive moments of force about the direction of travel that will resist any tendency of the trailer to overturn when cornering or travelling on uneven roads at operating speeds.

3. A releasable coupling for articulated vehicles according to claim 2 in which the brake means comprises an automotive wheel hub and automotive disc or drum brake assembly.

4. A releasable coupling for articulated vehicles according to claim 1 in which the brake means comprises an automotive wheel hub and automotive disc or drum brake assembly.

5. A releasable coupling for articulated vehicles comprising:
   (a) a base plate and support plates opposing said base plate, each adapted to being secured to the rear frame of the tractor vehicle;
   (b) a vertical spindle secured to the base plate;
   (c) an annular braking surface arranged for rotation about said vertical spindle;
   (d) disc or drum brakes secured to the said base plate, connected by valve means to the hydraulic or pneumatic braking system of the articulated vehicle and arranged to permit braking forces to be applied to the said annular braking surface when the wheel brakes of the articulated vehicle are applied;
   (e) an annular housing surrounding the annular braking surface and disc or drum brakes;
   (f) a horizontal turntable attached to the said annular braking surface and adapted to be supported by bearing surfaces adapted to be attached to the frame of the tractor vehicle, the turntable and attached braking surface being arranged for rotation as a unit about the said vertical spindle;
   (g) fifth wheel coupling secured to the said turntable and
   (h) a pair of locating members secured to the turntable and adapted to mate with a corresponding pair of locating members secured to the underside of the front of the trailer, each of the locating members being arranged a corresponding distance on each side of the longitudinal center line of the articulated vehicle so as to make sliding contact and come into said mating relation when the tractor is coupled to the trailer whereby rotation of the trailer with respect to the tractor will cause corresponding rotation of the turntable and annular braking surface as a unit about the said vertical spindle in the absence of the braking forces.

6. A releasable coupling for articulated vehicles according to claim 5 wherein said predetermined distance of said pair of locating members is selected so as to result in reactive moments of force about the direction of travel that will resist any tendency of the trailer to overturn when cornering or travelling on uneven roads at operating speeds.

7. A releasable coupling for a tractor trailer articulated vehicle, the coupling being adapted to connect a trailer unit having a conventional coupling pin of generally circular cross-section located laterally centred under its forward end to a tractor unit, the coupling comprising:
   (a) a base means adapted to be attached to the rear frame of the tractor unit;
   (b) a support means adapted to be attached to the rear frame of the tractor unit;
   (c) a brake means having one part thereof attached to the said base means;
   (d) a turntable attached to a second part of said brake means for rotation therewith, the turntable being adapted to be supported for rotation by bearing surfaces adapted to be attached to the rear frame of the tractor unit;
   (e) a fifth wheel coupling means attached to the turntable to be rotatable therewith and adapted to receive the coupling pin of the trailer unit;
   (f) a locating means attached to the turntable to be rotatable therewith, the locating means being positioned laterally of the fifth wheel coupling means on the turntable;
   (g) a complementary locating means adapted to be attached to the trailer unit under its forward end laterally of the coupling pin, the locating means and complementary locating means engaging when the coupling pin engages the fifth wheel coupling means such that the trailer unit, the turntable and the second part of the brake means rotate as a unit about a vertical axis when the tractor unit and trailer unit are coupled; and
   (h) a brake means adapted to be connected to the braking system of the tractor trailer articulated vehicle so that when the braking system of the vehicle is operated, rotation of the turntable and trailer unit with respect to the base means and tractor unit is prevented or inhibited.

8. A releasable coupling according to claim 7, wherein the locating means and complementary locating means comprise at least one mating pair of members being arranged on the turntable and on the trailer unit, respectively, a sufficient distance from the longitudinal centre line of the articulated vehicle so as to provide, upon application of the brakes, sufficiently large reactive moments of force about the direction of travel to resist any tendency of the trailer to overturn when cornering or travelling on uneven roads at operating speeds.

9. A releasable coupling according to claim 8, wherein the at least one mating pair of members are each elongated and enter into a sliding relationship during coupling of the tractor unit to the trailer unit and remain in a contiguous mated relationship while the tractor unit is coupled to the trailer unit.

10. A releasable coupling according to claim 7, wherein the brake means comprises automotive wheel hub and automotive disc or drum brake assembly.

11. A releasable coupling for a tractor trailer articulated vehicle, the coupling being adapted to connect a trailer unit having a conventional coupling pin of generally circular cross-section located laterally centred under its forward end to a tractor unit, the coupling comprising:
   (a) a base plate and support plates adapted to be secured to the rear frame of the tractor unit;
   (b) a vertical spindle secured to said base plate;
   (c) an annular braking surface arranged for rotation about said vertical spindle;
   (d) disc or drum brakes secured to the said base plate, connected by valve means to the hydraulic or pneumatic braking system of the articulated vehicle and arranged to permit braking forces to be applied to the said annular braking surface when the wheel brakes of the articulated vehicle are applied;
   (e) an annular housing surrounding the annular braking surface and disc or drum brakes;

(f) a horizontal turntable attached to the said annular braking surface and adapted to be supported by bearing surfaces adapted to be attached to the frame of the tractor unit, the turntable and attached braking surface being arranged for rotation as a unit about the said vertical spindle;

(g) fifth wheel coupling means secured to the said turntable to be rotatable therewith and adapted to receive the coupling pin of the trailer unit;

(h) a pair of locating members, each being adapted to be positioned under the forward end of the trailer unit on an opposite side of the trailer unit; and (i) a pair of complementary locating members secured to the turntable and adapted to mate with the pair of locating members secured to the underside of the front of the trailer unit, the mating members being arranged a distance from each side of the longitudinal centre line of the articulated vehicle so as to make sliding contact and come into said mating relation when the tractor unit is coupled to the trailer unit whereby rotation of the trailer unit with respect to the tractor unit will cause corresponding rotation of the turntable and annular braking surface as a unit about the said vertical spindle, in the absence of the braking forces.

12. A releasable coupling for an articulated vehicle according to claim 11, wherein the locating members are arranged a sufficient distance on each side of the longitudinal centre line of the articulated vehicle so as to result, upon application of the brakes, in reactive moments of force about the direction of travel that will resist any tendency of the trailer unit to overturn when cornering or travelling on uneven roads at operating speeds.

* * * * *